Figure 1:
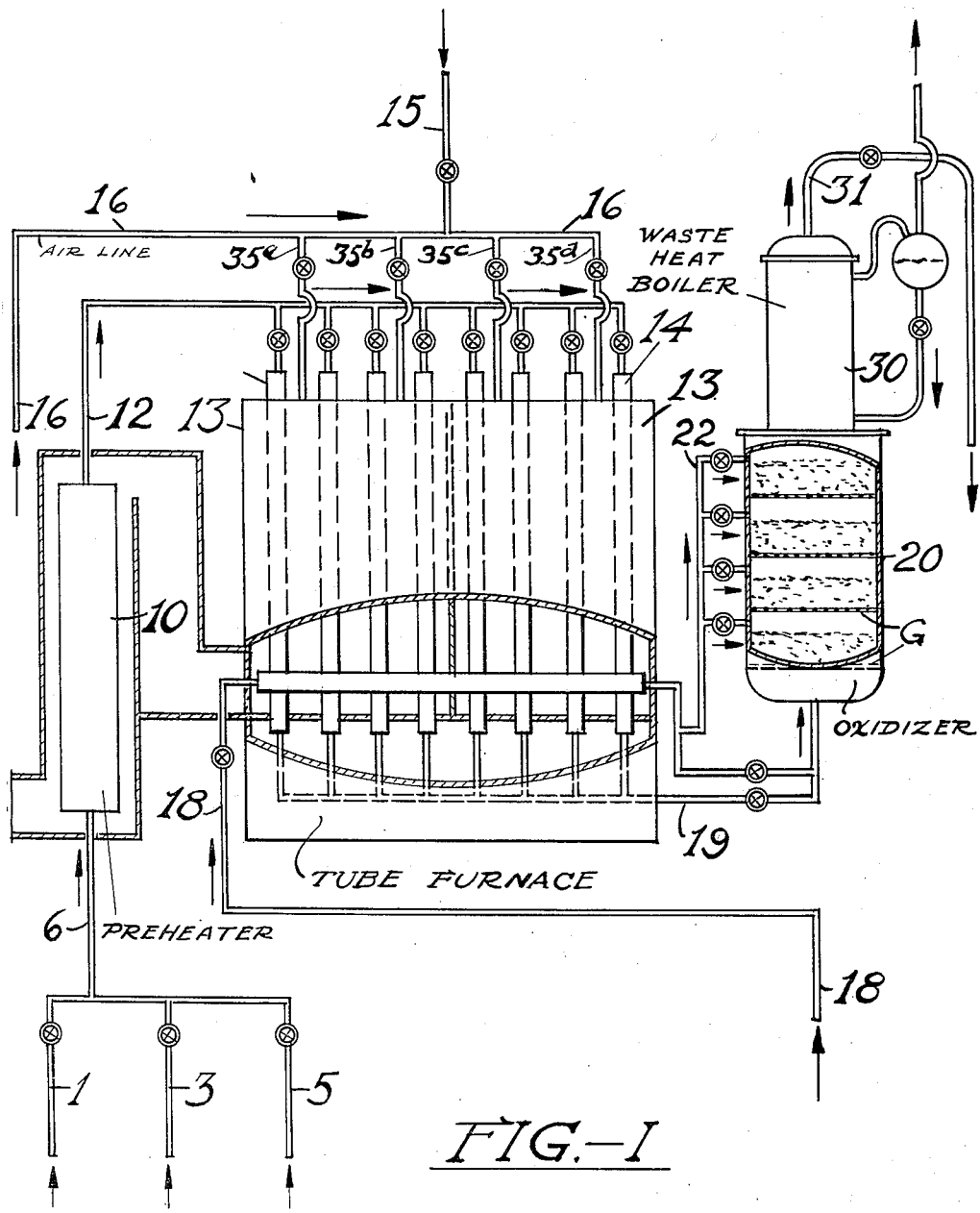

Jan. 9, 1951        W. G. SCHARMANN        2,537,708
PRODUCTION OF HYDROGEN-CONTAINING GAS UNDER PRESSURE

Filed Aug. 11, 1945        2 Sheets—Sheet 1

Walter G. Scharmann Inventor
By P. L. Young Attorney

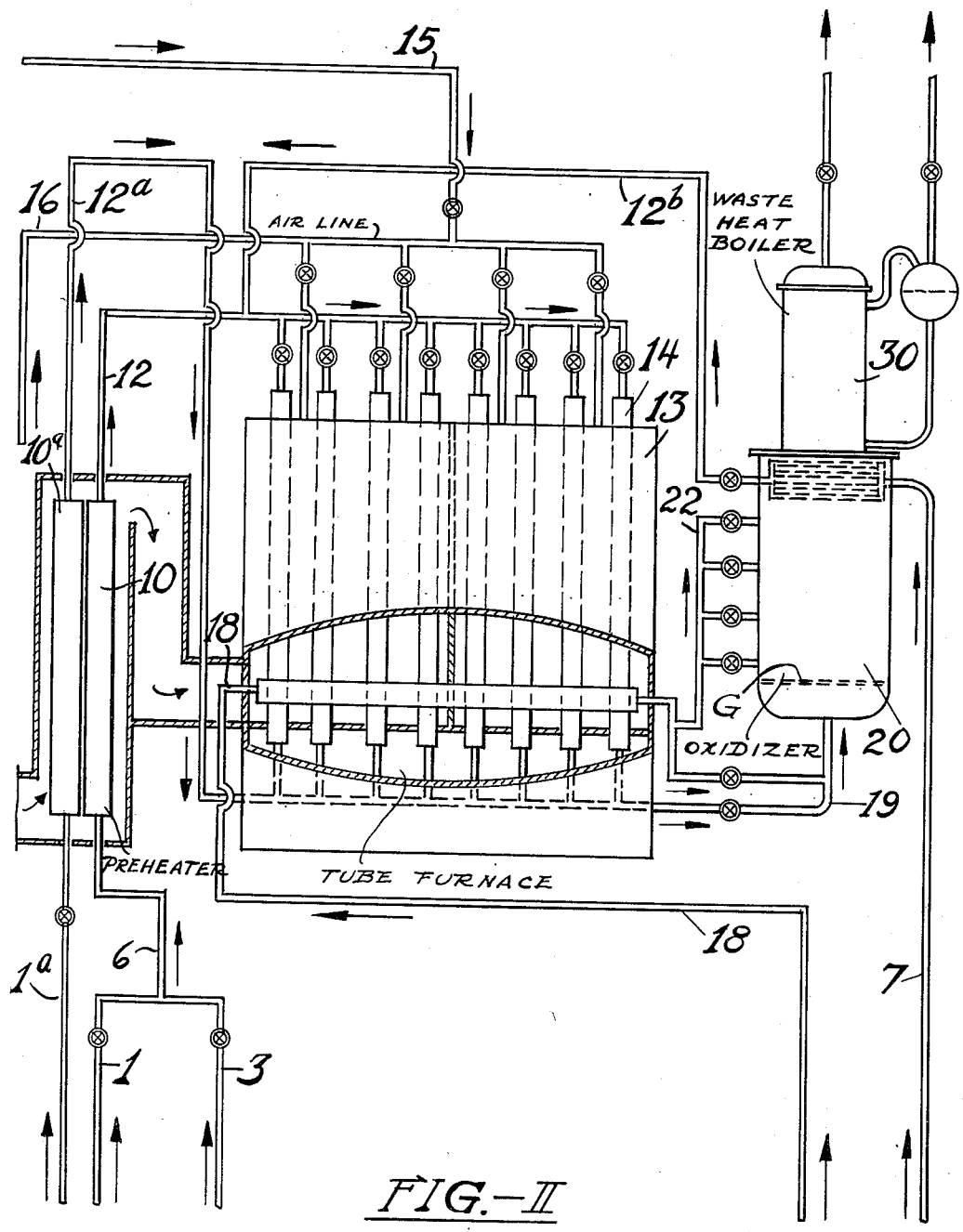
FIG.-II

Patented Jan. 9, 1951

2,537,708

UNITED STATES PATENT OFFICE 2,537,708

PRODUCTION OF HYDROGEN-CONTAINING GAS UNDER PRESSURE

Walter G. Scharmann, Westfield, N. J., assignor to Standard Oil Development Company, a corporation of Delaware Application August 11, 1945, Serial No. 610,342

2 Claims. (Cl. 23—212)

The novel features of my invention are fully disclosed in the following specification and claims read in connection with the accompanying drawings.

The production of hydrogen from natural gas or refinery gases by reformation in the so-called "tube process" is well known in the art. In this process catalyst is contained in a group of high alloy tubes which operate in parallel within a furnace. The amount of heat and temperature level required are thus obtained by transfer from the combustion gases within the furnace. Catalysts made from nickel metal or nickel on a supporting material have been found to be particularly useful in carrying out this process which may be illustrated by the following equation for methane:

$$CH_4 + H_2O = CO + 3H_2 \quad [1] \qquad (1)$$

When used for the production of hydrogen, the reformation furnace is followed by a conversion step in which additional steam is used to convert the carbon monoxide to hydrogen as illustrated by the following equation:

$$CO + H_2O = CO_2 + H_2 \qquad (2)$$

The reformation process may also be used to prepare $H_2$-$CO$ mixtures having definite ratios of $H_2$ to $CO$, by supplying $CO_2$ as well as steam to the reformer. Using methane as a typical hydrocarbon, the following equation illustrates the production of gas containing $H_2$ to $CO$ of 2 to 1:

$$3CH_4 + 2H_2O + CO_2 = 4CO + 8H_2 \qquad (3)$$

For the preparation of gas containing an $H_2$ to $CO$ ratio of 1 to 1, methane may be reformed with $CO_2$ as in the following equation:

$$CH_4 + CO_2 = 2CO + 2H_2 \qquad (4)$$

The above reactions are all endothermic, and the equations are merely simple illustrations of the main reactions performed. In actual practice, complete conversion of methane is not obtained nor is the selectivity toward CO formation 100% as indicated by the equations. Unconverted methane, some $CO_2$ and water appear as end products and hence the feed quantities of $CO_2$ and $H_2O$ must be adjusted accordingly.

In order to obtain a high degree of conversion of the hydrocarbons used in the process, it is necessary to operate commercially at catalyst temperature levels of, say, 1400–1600° F. The tubes are obviously at somewhat higher temperatures and hence it is impossible to operate at pressures very much above atmospheric because of the strength characteristics of the alloys employed. The high temperature required for the reaction also limits the amount of heat which can be transferred and thereby limits the production capacity of the tube furnace.

To overcome these difficulties and permit the production of hydrogen or hydrogen-containing gases under pressure thus being enabled to take advantage of several favorable factors, which are described further on, I propose to operate the tube furnace followed by and in combination with an oxidizing step. The tube furnace will operate at a lower temperature level than is usually employed in order that the tubes will satisfactorily withstand the pressure employed. Under these conditions the degree of conversion of the hydrocarbon gas used in the process is, however, lower than desirable and considerable unconverted methane is contained in the hot gases leaving the furnace. The lower temperature does, however, increase the heat transfer capacity and thereby the production capacity of the furnace.

In the oxidizing step the partial combustion of methane may be illustrated by the following reaction:

$$CH_4 + O_2 = CO + H_2 + H_2O \qquad (5)$$

This reaction is, of course, exothermic.

The combination of the partial combustion reaction with the reformation reaction may be illustrated for the production of gas containing a ratio of $H_2$ to $CO$ of 1 to 1 by combining Reactions 4 and 5. If (F) signifies the moles of oxygen used per mole of methane, the following is obtained:

$$CH_4 + F(O_2) + (1-F)CO_2 = \\ (2-F)CO + (2-F)H_2 + (F)H_2O \qquad (6)$$

Here again the reaction is idealized, since in practice unconverted methane, $CO_2$ and more water than indicated appears in the end products and to obtain the equal molal ratio of $CO$-$H_2$ shown requires a proper adjustment of $CO_2$ and $H_2O$ in the feed gases. It will be observed that when F equals 1 in Equation 6, the reaction reverts to Equation 5 and conversion is entirely by partial combustion. If F equals 0, the reaction reverts to Equation 4 and the conversion is entirely by reformation. By the proper use of oxygen I have found that it is possible to obtain a combination of reformation and oxidation which is more economical than either alone.

Although the above reactions illustrate the use

[1] This reaction is called "reformation."

of reformation-oxidation in the production of gas having an $H_2$ to CO ratio of 1 to 1, similar equations may be used to illustrate the production of gases having a 2 to 1 ratio. The ratio is, however, not limited to 1 to 1 or 2 to 1 but may be adjusted widely to cover and exceed these limits.

The partially reformed gas leaving the furnace under pressure will be collected in a suitable manifold and led into a well-insulated vessel containing catalyst which may be similar in composition to that used in the reformer tubes. The vessel may contain a series of separated catalyst beds or, if desired, a number of vessels may be used in series, each vessel comprising a single catalyst bed. The gas will be introduced to the vessel by means of a special burner to which oxygen-containing gas is supplied. Additional oxygen may be added at the various catalyst beds or to the inlet of the vessels if a series arrangement is employed. The oxygen content of this gas may vary between that of air and 100% oxygen depending on the degree to which the elimination of diluent nitrogen from the gas produced is desirable. Oxygen introduced in this manner, in the proper amount, raises the temperature of the gases by partial combustion. Because of the high temperature obtained, the methane content of the final gas leaving the oxidizer may be maintained satisfactorily low.

Following the oxidizer or in the upper section of the oxidizer, I install a waste heat boiler which will reduce the gas temperature and thereby "freeze" the composition of the gases at the high temperature level used in the oxidizer. Heat exchangers and coolers are employed after the waste heat boiler or in case the process is for the production of hydrogen alone, a carbon monoxide converter may be installed before the gas is finally cooled.

The carbon dioxide in the final gas may be removed by means of a scrubber employing conventional means.

For the production of hydrogen-carbon monoxide mixtures used in the synthesis of hydrocarbons, the process gas will be mixed with both carbon dioxide and steam and the excess (25–150%) is based on both gases since it has been found that carbon dioxide is equivalent to steam mole for mole. The relative amounts of carbon dioxide and steam used will, of course, depend upon the carbon content of the hydrocarbons in the process gas used together with ratio of hydrogen to carbon monoxide desired in the final gas and the extent to which oxygen is used in the oxidizer. In all of the above cases the reactant mixture may or may not be preheated.

The gas throughput in the reformer tubes may range from 500–4000 volumes of theoretical $H_2$ plus CO per volume of catalyst per hour. Theoretical $H_2$ plus CO is defined as the total moles of $H_2+CO$ obtained by complete conversion of the hydrocarbons with steam. Maximum reformer catalyst operating temperatures ranging from 1300–1500° F. are used in the preferred form of operation of my process to obtain hydrocarbon conversions of approximately 65–85%. At these temperature levels the pressure of operation may range between 15–150 p. s. i. g.[2]

The throughput in the oxidizer may also range between 500–4000 V./V./Hr. (above basis) with a minimum operating temperature ranging between 1500° F. and 1800° F. at pressures of 15–150 p. s. i. g. as set by the reformer operation.

Air or enriched air (preheated if desired) containing between 21 and 100% oxygen may be added to the oxidizer to effect satisfactory conversion of the methane left in the gas leaving the reformer. In the case of the production of hydrogen-carbon monoxide, the addition of oxygen-containing gas may also be used to control, within limits, the ratio of hydrogen to carbon monoxide produced. I may use oxygen amounting to 0.1 to 0.6 mole per atom of carbon contained in the hydrocarbons of the process gas fed to the reformation oxidation unit but prefer to operate in the range of 0.25 to 0.45 mole oxygen per carbon atom.

I have also found that the production capacity of a definite-sized reformer unit may be increased substantially by providing for a greater use of oxygen in the oxidation step. For example, a reformation-oxidation unit using a 4-section reformer containing one hundred seventy-six 4-inch tubes has a capacity of 24.0 mm. C. F. D.[3] of $CO+H_2$ produced at an 82.5% concentration from natural gas at about 50 p. s. i. g. when the reformed gas plus air amounting to 0.175 mole oxygen per atom of carbon in the natural gas is passed through the oxidizer. With the same size furnace, the production may be increased to 44.0 mm. C. F. D. of $CO+H_2$ at the above concentration and pressure by using enriched air containing 37.1% oxygen, to the extent of 0.35 mole per atom of carbon. In this case, an oxygen plant is necessary to provide the enriched air. The amount of gas handled in the reformer is substantially the same in both cases. However, in the case wherein enriched air is used, natural gas equivalent to that fed to the reformation furnace is merely preheated to 1000–1200° F. by heat exchange and this preheated gas is fed together with the partially reformed gas plus the enriched air to the oxidizer. The amount of oxygen supplied to the oxidizer is insufficient to burn all of the methane but nevertheless unduly high combustion temperatures may be obtained if proper means for the addition of the oxygen is not provided. As mentioned earlier, and depending upon the extent to which oxygen is used, the oxidation vessel may contain separate beds with provision for mixing the gases passing through with additional oxygen at the inlet of each bed or a series of oxidation vessels may be employed with means for addition and mixing at the inlet of each vessel.

In addition to the above methods for controlling the maximum temperatures in the oxidizer to a range of 1800–2500° F. and preferably 1800–2200° F., I may employ the use of powdered or finely dispersed catalyst in a fluid type oxidizer. In this type of reactor the exothermic combustion reactions proceed with the endothermic reformation reactions and a satisfactory balance is obtained between them. This is possible because of the "fly wheel" action of the fluid catalyst in quickly dispersing combustion heat to all parts of the reactor wherein reformation which requires heat, is taking place. Satisfactory temperature control is thereby obtained.

In the example cited, half the natural gas was passed through the reformer and half was merely preheated before entering the oxidizer. Obviously, other combinations may be used depending on the extent to which oxygen is used.

---

[2] P. s. i. g.=pounds per square inch gauge pressure.
[3] Cubic feet per day.

In the accompanying drawings, I have shown in Figure I diagrammatically an apparatus layout in which my invention may be carried into effect, and in Figure II, a modification thereof. Similar reference characters refer to similar parts throughout the views.

Referring in detail to Figure I, I introduce in the present system natural gas, $CO_2$ and steam through lines 1, 3, and 5, respectively. Instead of using natural gas, I may use methane or any normally gaseous hydrocarbon containing 1 to 4 carbon atoms in its molecule and which is of satisfactorily low sulfur content. If necessary, I may employ a desulfurization step in the process gas. These gases may also contain carbon dioxide, hydrogen, nitrogen, and carbon monoxide, none of which is objectionable. In some cases it may be economical to use a narrow boiling gasoline fraction. In this case, special catalysts may be employed which are more resistant to coke depositions from the higher boiling hydrocarbons. A confluence of these streams (hydrocarbon, $CO_2$, and steam) is effected in line 6 and the mixture is passed through a preheater 10 where it is heated to a temperature of about 1000° F. and thereafter it is withdrawn through a pipe 12 and thence discharged into a reformer furnace 13 containing a plurality of pipes or tubes 14. A preferred form of furnace is one which, as previously indicated, consists of four sections, each containing forty-four tubes, 4 inches in internal diameter. Since the reaction of reforming methane to form hydrogen and CO is endothermic, it is necessary that heat be supplied, and to the accomplishment of this, I introduce a fuel through line 15 and by means of manifold 16 supply the fuel to a series of gas burners indicated as 35a, 35b, 35c, and 35d. I may, of course, take advantage of the heat in the flue gas leaving the furnace to supply the burners with preheated air. The reformer furnace 13 is so operated that the outlet temperature is about 1400° F. and a pressure of about 50 pounds per square inch gauge is maintained in the exit collecting manifold from the reforming tubes 14. Under these conditions only a portion of the hydrocarbons in the natural gas fed to the reformer is converted to CO and hydrogen. Unconverted material appears as methane in the gas leaving the tubes. The material exiting from the reformer, therefore, is conveyed to an oxidizer 20 via a manifold 19. The oxygen-containing gas necessary for the "clean up" or essentially complete conversion of the methane is supplied through a line 18 which passes through reformer furnace 13 for the purpose of preheating this gas to a temperature of about 500–1000° F. whereupon the heated gas is withdrawn and discharged into a manifold 22, carrying branch pipes which discharge the preheated gas into oxidizer 20 at spaced points as indicated in the drawing. A portion of the gas may be mixed with the product gases from the reformer before the latter enter the oxidizer. In the oxidizer 20 which contains a catalyst which may be the same as that employed in the reformer, or any other suitable catalyst the oxygen-containing gas converts the unchanged methane to CO and hydrogen, a minimum temperature of about 1600° F. prevailing in the oxidizer. The product gases are withdrawn from the oxidizer through a waste heat boiler 30, where the gases are cooled to a temperature of about 800° F. whereupon they are withdrawn through a line 31, cooled if necessary, and eventually delivered to a plant where they are used as feed gases in the manufacture of hydrocarbons. If air is employed as the oxidizing gas entering in line 18, the product gases in line 31 will, of course, contain nitrogen but will also, of course, contain $H_2$, $CO_2$, CO, steam, and possibly small traces of oxygen. The art is familiar with the method of removing steam, $CO_2$, and converting the CO to hydrogen and $CO_2$ with steam, and it will not be necessary for me to describe these purification processes in detail. It will be necessary to limit the amount of nitrogen introduced with the oxidizing gas to the amount tolerable in the final gas—which gas may be employed directly in the synthesis or may be cooled to remove water and, if necessary, the $CO_2$ may be removed. In the event that the product gases are to be high in CO plus $H_2$ concentration, substantially pure oxygen may be used as the oxidizing agent in reactor 20.

For an economical layout the skilled engineer will appreciate that numerous engineering accessory apparatuses, including heat exchangers, flow control means, pumps, compressors, and the like will be necessary to conserve heat, to control temperature, flow rates, and the like.

All such accessory apparatus I have omitted from the drawing for purposes of simplicity but more particularly to direct attention to the real heart of my invention. However, it is to be understood that my invention is intended to include the use of all known engineering aids, procedures, and equipment which will enable the performance of my invention in a practical and economical manner from an engineering standpoint.

In Figure II, I have shown a modification in which a portion of the hydrocarbon process gas is passed directly into the oxidizer. Thus, for instance, a portion of this gas, which may be methane or natural gas, enters the system through line 1a, then passes through preheater 10a and thereafter is passed through line 12a into line 19 thereby by-passing the reformer furnace 13. Another portion of the mixture of process gas, steam, and $CO_2$ may be passed via line 7 through a heat exchanger in the top of the oxidizer 20 and then withdrawn through line 12b and discharged into the manifold in communion with the tubes 14 in the reformer, the purpose of passing a portion of the material through the upper portion of oxidizer 20 being, of course, to abstract heat from the top of the oxidizer. I prefer to limit the gas which is heat exchanged in the oxidizer to the steam and $CO_2$ required by the reformer, charging the remaining portion of process, methane, or natural gas mixed with any additional $CO_2$ and/or steam if necessary, via line 6 through the preheater 10 and thence into the reformer 13 just as in the process of Figure I. Otherwise, the process of Figure II is operated in the same manner as that shown in Figure I. With respect to the oxidizer 20, it may be pointed out that instead of using the stationary bed or beds of catalyst shown in Figure I, I may use a series of such vessels or a fluid reactor as shown in Figure II. That is to say, the reactor 20 in Figure II may contain a dense suspension of powdered catalyst in the gasiform material. For instance, by flowing the gases upwardly through a grid G located in the bottom of the oxidizer at a velocity of from ½ to 10 feet per second, preferably from 1½ to 3 feet per second where the catalyst size is from 100–400 mesh, I form a dense, turbulent fluid mass of catalyst which, because of its turbulence, will tend to have a uniform temperature throughout and provide good temperature control. It should be remembered that the temperatures in the oxidizer 20 are fairly high and it is desirable, of course, to prevent hot spots and to maintain a uniform temperature and as indicated, a fluid mass of catalyst is particularly adapted to provide this type of control.

It should be further pointed out that oxidizer 20 in Figure I may also be operated as a fluid reactor, as previously described, in connection with oxidizer 20 in Figure II. In other words, oxidizer 20 in Figure I or Figure II may be operated as a stationary bed type of catalyst reactor or in either case, the oxidizer 20 may contain a fluidized mass of catalyst. It will be understood that in conjunction with a fluid mass of catalyst it is necessary to employ centrifugal separators and/or electrical separators to separate entrained catalyst from the vapor; and since these are known to the art, I have not shown them in the drawing.

I set forth below operating conditions giving good and best results:

|  | Broad Range | Preferred Range |
|---|---|---|
| *Reformer:* |  |  |
| Pressure (outlet)____p. s. i. g__ | atm—300 | 15–150 |
| Temperature (maximum catalyst)_____°F__ | 1,600–1,000 | 1,500–1,300 |
| Excess H₂O and/or CO₂__per cent__ | 25–150 | 25–100 |
| Throughput v./v./hr. (CO + H₂ based on total hydrocarbon fed to reformer)_____ | ¹500–4,000 | ¹1,000–3,500 |
| Ratio H₂O to CO₂ fed to reformer__ | Dependent on H₂/CO ratio desired in final gas together with C/H ratio of process gas and amount of oxygen used. Range 0.25–6.0. | |
| Conversion of Carbon (fed to reformer)_____per cent__ | 50–90 | 65–85 |
| Per Cent of total H₂-CO Production_____per cent__ | 20–85 | 30–75 |
| *Oxidizer:* |  |  |
| Pressure (outlet)_____p. s. i. g__ | atm—300 | 15–150 |
| Minimum Temperature_____°F__ | 1,400–2,000 | 1,500–1,800 |
| Maximum Temperature_____°F__ | 1,800–2,500 | 1,800–2,200 |
| Throughput v./v./hr. (H₂ + CO based on total hydrocarbon feed to reformer plus oxidizer)_____ | ¹500–4,000 | ¹1,000–3,500 |
| Conversion of Carbon (Overall) per cent__ | 50–100 | 90–99 |
| Oxygen, moles/atom C (In total hydrocarbons)_____ | 0.1–0.6 | 0.25–0.45 |
| Oxygen concentration___per cent__ | 21–100 | 21–95 |
| Per Cent of Total H₂-CO production_____ | 80–15 | 70–25 |

¹ For example, a space velocity of 1000 v./v./hr. of H₂+CO using pure methane as the feed gas requires the use of $$\frac{1000}{4} = 250 \text{ v./v./hr.}$$

of methane; $CH_4 + H_2O \longrightarrow CO + 3H_2O$. If pure ethane made up the entire feed gas $$\frac{1000}{7} = 143 \text{ v./v./hr.}$$

of ethane would be required; thus, $$C_2H_6 + 2H_2O \longrightarrow 2CO + 5H_2.$$

It will be appreciated that the feed rates given are based upon 100% conversion of the hydrocarbon fed to the reformer, a circumstance which will not ordinarily occur. This method of expressing feed rates is, however, conventional in the present art. Since commercially used hydrocarbon gases are generally mixtures of the normally gaseous hydrocarbons, the operator will fix the feed rate of a given gas responsive to its actual composition and the throughputs given above.

To recapitulate, my invention involves improvements in the formation of CO+H₂-containing gas which may be adapted for use in hydrocarbon synthesis process wherein the ratio of hydrogen to CO may be readily adjusted to 2 to 1 down to 1 to 1 and even lower and higher if desired. The gist of the invention resides in the following features:

1. A two-stage conversion in the first stage of which steam, hydrocarbon-containing process gas and CO₂ if desired, are reformed in the presence of a suitable catalyst and under super-atmospheric pressure to give a product containing CO, H₂, CO₂, H₂O, and some hydrocarbon gas and then passing this product through an oxidizing zone where it contacts a free oxygen-containing gas to convert at least a portion of the remaining hydrocarbon gas to CO and H₂ at higher temperatures than those employed in the first stage and super-atmospheric pressure equal or lower (due to pressure drop) than those in the first stage.

2. Another feature which is supplementary to that immediately above involves splitting the hydrocarbon process gas feed stream and forcing merely a portion of it through the reforming stage with steam and/or CO₂ if desired, while forcing the remainder of the gas directly to the oxidizing zone.

One of the chief advantages of the invention is the fact that by the combined use of reformation and oxidation it is possible to produce H₂-CO and also H₂-N₂ mixtures under pressure and at temperatures higher than can be obtained by indirect heat transfer (only using reformer furnace). Oxygen reduces the amount of heat to be transferred in the reforming furnace thereby effecting a saving in the expensive alloy tube surface required in this apparatus. The higher temperature obtainable by direct heating with oxygen favors complete conversion of methane and lower carbon dioxide content in the gas produced.

Since in the oxidizer there is a combustion or ordinary burning taking place, together with reformation, there is some danger of attaining excessive temperatures. In order to counteract these excessive temperatures in the oxidizing zone where a stationary bed or beds of catalyst is employed, it may be advisable to use fluid catalyst which would act as a sort of "fly-wheel" or reservoir to store up heat released during the oxidation to be employed in the endothermic reaction of reforming the residual hydrocarbon thus controlling temperature by counter-balancing the two types of reactions against each other.

What I claim is:

1. A process for manufacturing a mixture of CO and H₂ which comprises reacting together in the first stage in the presence of a suitable catalyst a mixture of steam, normally gaseous hydrocarbon and carbon dioxide at temperatures within the range of from about 1300°–1500° F. and under pressures of from about 15–150 p. s. i. gauge to form a product containing CO, H₂ and CO₂ and unchanged hydrocarbon and then passing this product through an oxidizing zone in which is disposed a plurality of spaced beds of catalyst and therein contacting the said CO, H₂, CO₂ and unchanged hydrocarbon with a free oxygen containing gas, thus causing burning of combustibles and liberation of heat whereby the remaining portion of the unchanged hydrocarbon is largely converted to CO and hydrogen, the process being further characterized in that at least a portion of the oxygen containing gas is injected into the oxidizing zone in the spaces between the beds of catalyst.

2. A process for the manufacture of CO and H₂ which comprises reacting together in the first stage in the presence of a suitable catalyst a mixture of steam, methane-containing gas and carbon dioxide at temperatures within the range of from about 1300°–1500° F. and under pressures of from about 15–150 p. s. i. gauge to form a product containing CO, $H_2$, $CO_2$ and unchanged methane and then passing this product through an oxidizing zone in which is disposed a plurality of spaced beds of catalyst and therein contacting the said CO, $H_2$, $CO_2$ and unchanged methane with a free oxygen containing gas, thus causing burning of combustibles and liberation of heat whereby the remaining portion of the unchanged methane is largely converted to CO and hydrogen, the process being further characterized in that at least a portion of the oxygen containing gas is injected into the oxidizing zone in the spaces between the beds of catalyst.

WALTER G. SCHARMANN.

REFERENCES CITED

The following references are of record in the file of this patent:

UNITED STATES PATENTS

| Number | Name | Date |
|---|---|---|
| 1,736,065 | Williams | Nov. 19, 1929 |
| 1,921,856 | Wietzel et al. | Aug. 8, 1933 |
| 1,960,912 | Larson | May 20, 1934 |
| 2,355,753 | Roberts, Jr. | Aug. 15, 1944 |